(No Model.)

M. J. DEMPSEY.
PROCESS OF AND APPARATUS FOR EXTRACTION OF TALLOW AND MEAT EXTRACTS, &c.

No. 541,599. Patented June 25, 1895.

Attest
Walter D. Malusky
James M. Spear

Inventor
Michael J. Dempsey
by Richards & Co.
Attys

UNITED STATES PATENT OFFICE.

MICHAEL JAMES DEMPSEY, OF SYDNEY, NEW SOUTH WALES, ASSIGNOR TO JAMES MACKAY, OF SAME PLACE.

PROCESS OF AND APPARATUS FOR EXTRACTION OF TALLOW AND MEAT EXTRACTS, &c.

SPECIFICATION forming part of Letters Patent No. 541,599, dated June 25, 1895.

Application filed January 29, 1895. Serial No. 536,619. (No model.)

*To all whom it may concern:*

Be it known that I, MICHAEL JAMES DEMPSEY, a British subject, residing at Waverley, Sydney, in the Colony of New South Wales, have invented new and useful Improvements in Processes of and Apparatus for the Combined Extraction of Tallow and Meat Extracts and for Rendering the Resultant Gases and Liquids Innoxious; and I do declare that the following is a full, clear, and exact description of the invention, which will enable others skilled in the art to which it appertains to make and use the same.

My invention has for its object the simplification of the process employed for the recovery of tallow fat from animal substances, by avoiding, in the process of manufacture, the production of the objectionable liquid technically termed "soup." Its further object is to combine with the recovery of tallow fat, and at the same time such process is going on, the nutritious meat extract which is an article of commerce, and which now is only obtained by a secondary process. The combined recovery of the tallow fat and meat extract is performed, in this case, in one apparatus, and under precisely the same conditions.

A further important improvement, forming part of the process embodied in this invention, is the treatment of the resultant gases arising during the cooking operation, by which all deleterious and noxious vapors are rendered innoxious, so that the pollution of the atmosphere in the vicinity of the works where this invention is used is avoided.

In order to carry out the simplified process and to obtain the advantages connected with the recovery of the tallow fat in combination with the meat extract, and the further treatment of the noxious gases I construct my apparatus in such a manner that the combination and arrangement of the relative parts will each be capable of performing its proper function at the required time and in the most efficient manner.

Figure 1:
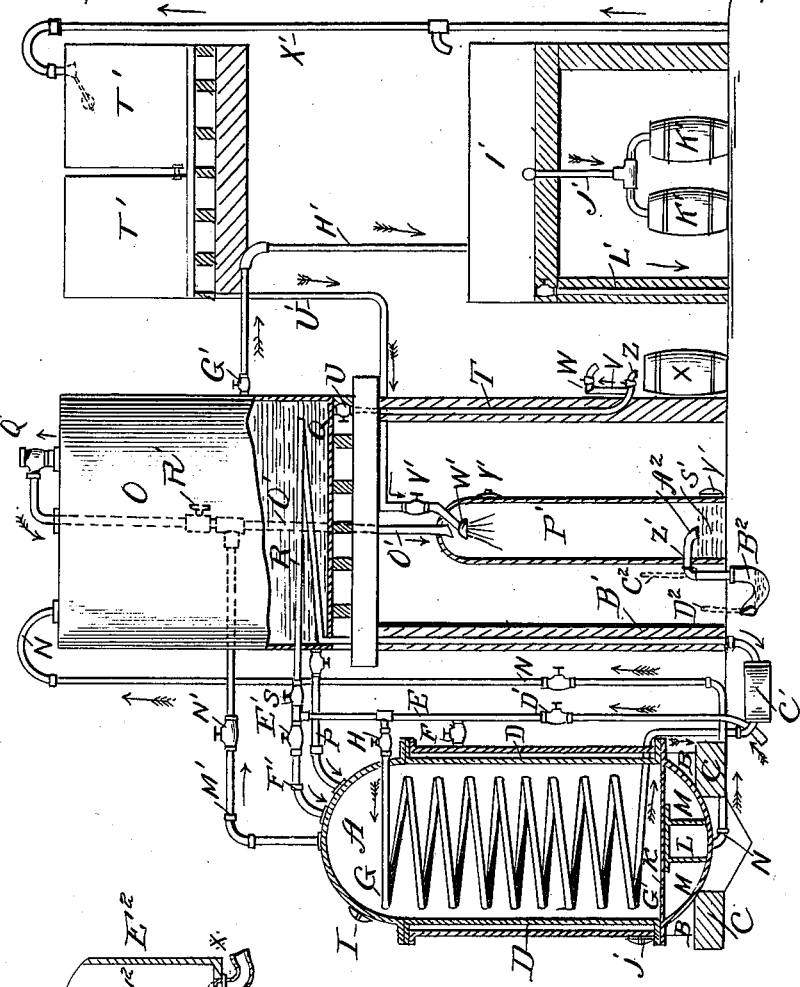
Figure 2:
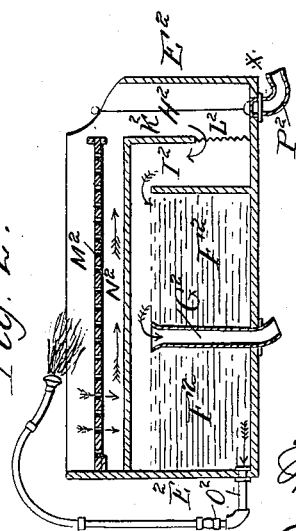

In the accompanying drawings I illustrate in Figure 1 one form of such apparatus, which may be considered rather as a diagrammatic representation than a strictly working apparatus. The general arrangement of the parts is subject to diversified modifications, and may be varied in form, and their relative positions may be changed to suit local requirements, but all such modifications would necessarily embody the performance of the functions set out in this description, so as to obtain the desired results. Fig. 2 is a sectional view of a supplemental apparatus for treating the residuum which remains in the digester.

The digester A is the usual metal receptacle provided for holding the animal substance to be treated, and is supported upon the bearing plates B resting upon the foundation C. I combine therewith under some circumstances the jacketed chamber D, which is a receptacle for the steam to be used in the cooking process. This is connected with the main steam pipe E, and is provided with the stop valve F for regulating the supply. Inside of A, I also place the steam coil G. Both D, and G may be used either conjointly in connection with the digester A, or either of them may be used separately with A. G is also connected with E, and is provided with the stop cock H.

The digester A is provided with the usual man holes with the tightly fitting doors, I being the feed door through which the animal substance is placed, J the discharge door through which the refuse is withdrawn after the process has been completed. K perforated removable bottom, L perforated support for K. M draw off chamber through which the tallow and extract passes into the pipe N whence it is conveyed to the receiving chamber O, this chamber being also used to hold a certain quantity of tallow to be used in a liquefied form for charging the digester, such tallow being used in the initial stage of the process to fill the interstices formed between the animal substances with which the digester is charged, the delivery pipe P being used for the purpose.

I can use a separate vessel to serve as a receptacle for the liquefied tallow for charging the digester, and if such were used it might be recharged by means of similar connections to those employed for returning the tallow to O, and the operation would be precisely similar to that described.

The lower portion Q of O, besides being the container for the liquefied tallow used for charging the digester, for which purpose the steam coil R is provided, and receives it supply of steam from the pipe E, through the medium of the stop cock S, is also the receptacle for the nutritious meat extract precipitated during the cooling operation through the tallow contained in O, such extract being drawn off through the delivery pipe T, having the controlling stop valve U, and also the liquor stand pipe V, with its draw off cock W, for separating the liquor from the meat extract which is delivered into the receptacle X, by opening the stop cock Z. The outlet end of both G, and R, are suitably connected by means of the drain pipes A' and B' to the steam trap C'. Such steam trap may consist of any of the well known appliances in use for trapping the prime steam and condensed water, and disposing of the same automatically by means of a siphon discharge pipe. The main or supply steam pipe, E, besides being furnished with the stop valves H and S, which are connected with the coils G and R, has also the main stop valve D' by which the whole supply is regulated, and the further stop valve E' which controls the supply of steam to the pipe F', such supply being used for the purpose of ejecting the tallow and extract from the digester which is accomplished through the medium of the pipe N connected with M and O.

The tallow which has been ejected from the digester into the receiving chamber O is drawn therefrom by the stop cock G' whence it will flow through the delivery pipe H' into the cooler I'. Any number of such coolers may be used, from whence it may be delivered through the delivery pipe J' into the casks K'.

L' is a drain pipe for the removal of liquor and other impurities precipitated during the cooling operation.

The apparatus as described so far, represents the process by which the avoidance of the liquid termed "soup" is brought about, and the introduction of the liquefied tallow by which the boiling process is carried on with the aid of the steam coil or jacket, or both, the expulsion of the air from the digester and the discharge of the tallow extracted from the animal substances, and also its delivery into the receptacles provided for it, together with the nutritious extract of meat. The rest of the apparatus is used for the treatment of the resultant gases which arise during the cooking process. For this purpose the fume pipe M' is attached preferably to the crown of the digester, so that whatever noxious vapors or gases are generated during the cooking process they will pass into this pipe, which is provided with the stop cock N' in order to control the escape of these gases when necessary, or to close the circuit during the time the tallow and extract are being expelled from the digester. M' is further connected with the pipe O', one end of which enters the condenser P', the other end being connected with the tallow and extract receiving chamber O, and provided with a check valve Q' and also the stop valve R'. Shown in dotted lines. The function of the check valve Q' is to prevent the fumes, which pass out through M' into P', having access to O, but at the same time Q' will allow the egress of the fumes coming from the tallow and meat extract within O to pass down O' into P'. The bottom portion S' of P' is termed the washing chamber, which contains a solution of caustic soda and chloride of sodium of sufficient strength by diluting with water to neutralize and decompose the resultant noxious fumes as they escape from the digester. The strength of this solution will vary to a greater or less degree according to the degree of impurity, if any, contained in the animal matter under treatment. This solution has its supply augmented during the time the gases are flowing into P', from the main source contained in the liquor storage tanks T' through the medium of the delivery pipe U' provided with the stop cock V', and having a spraying nozzle W' suitably placed within P'. X' represents the water service pipe delivering into T' and also available for use in connection with I'. This may be arranged in any way thought desirable. The condenser P', which may be constructed of any suitable metal or earthenware, is provided with the man holes or access doors Y', by which it is hermetically sealed. The washing chamber S' previously referred to, is provided with an outlet pipe Z', so placed that the solution is preserved at a uniform level. The inner end of Z' is provided with a bell mouthed connection $A^2$, so shaped as to be easily available for the discharge of the gases which have been rendered innoxious by the spraying operation of W' and in their subsequent passage through the solution contained in S', a portion of which escapes from time to time through Z' into the drainage trap $B^2$, which may be connected with an efficient water supply, say by the connection $C^2$, by which it is cleansed when desired.

As a further precaution against the possible escape of any offensive fumes, I provide a connection from Z' which may be the pipe $D^2$, which is further connected with the heating furnace of an ordinary steam boiler, or any other furnace which may be in close proximity to the works. The passing of the fumes or gases into such furnace is for the purpose of bringing them in contact with the fire, by which they are further purged before being passed into the chimney of such furnace.

In order to treat the residuum which remains in the digester after the extraction therefrom of the tallow and meat extracts and to obtain the surplus tallow clinging to the said residuum, I provide a further apparatus to serve as an adjunct to the foregoing. It consists of a tank, or chamber $E^2$ divided into compartments. The bottom portion $F^2$ contains the water for washing purposes and is furnished with a standing waste $G^2$ for the outflow of the tallow which is held in suspension in $F^2$. Two (2) compartments $H^2$ and $I^2$ are placed contiguous to $F^2$ and are separated by the dependent plate $K^2$, the lower portion of which is provided with a screen $L^2$ which may be of cocoanut fiber or other suitable material.

$H^2$ is termed the screening chamber, and into it the solids held in suspension in the water are precipitated, such solids coming from the residuum which is placed upon the perforated draining table $M^2$, after they have been washed on to the race $N^2$. The circulation of the water from $F^2$, which may heated by a steam coil or jacket in the same manner as described for the digester, is accomplished by the circulating pipes $O^2$, by any suitable pump or ejector. The pipe $O^2$ is carried over the draining table $M^2$ and may have any form of flexible connection which will allow of the diversion of the washing fluid to any portion of the residuum under treatment.

$P^2$ is the outlet in $H^2$ for the discharge of the sediment or liquid and sediment as may be required, and is provided with a valve $p^3$.

When the washing process has been completed the residuum may be transferred to a suitable press to express any remaining moisture, which will facilitate the drying process.

The operation of the device is as follows: The digester A is filled through the feed door I, with the animal substances to be treated, and the interstices between the substances are then filled with liquid tallow. Steam is then turned on and the contents of the digester boiled or cooked a suitable length of time. During the cooking the gases are led off through pipe M' to condenser $p'$. When the substances have been treated for a sufficient length of time valve N' is closed and steam is then admitted to the digester through pipe F' and the tallow and meat extracts are forced into the chamber O. Here the extract is allowed to settle and may be drawn off by pipe T while the tallow is conveyed through pipe H' to the cooler I' and thence to the receptacle K'. The residuum which remains in the digester after the tallow and meat extracts have been driven off by the steam is then placed upon the drawing table $M^2$ and subjected to washing action by which all remaining tallow is washed from the residuum. While the substances are being cooked in the digester the gases are led away, as before stated, to the condenser $p'$ where they are washed by a solution of caustic soda and a chloride of sodium whereby the noxious fumes are neutralized or decomposed.

Having now particularly described and ascertained the nature of my said invention and in what manner the same is carried into effect, what I claim, and desire to secure by Letters Patent of the United States of America, is—

1. The process of treating animal substances containing tallow and meat consisting in introducing said substances into a suitable digester, adding liquid tallow thereto, boiling said animal substances and tallow together and finally forcing out both the originally contained and the extraneous tallow and meat extracts, substantially as described.

2. The process of treating animal substances containing tallow and meat, consisting in placing the substance in a closed receptacle, filling up the interstices with liquid tallow, heating the contents to cook the same, drawing off the gases during the cooking, subsequently drawing off the originally contained and extraneous tallow together with the meat extract, and finally separating the meat extract from the tallow, substantially as described.

3. The process of treating animal substances containing tallow and meat, consisting in placing the substances in a closed receptacle, filling up the interstices with liquid tallow, heating the said contents, conveying away the gases and subjecting them to the action of a disinfecting or decomposing agent, and finally withdrawing the originally contained and extraneous tallow together with the meat extract and allowing them to stand and settle whereby said products are separated, substantially as described.

4. The process of treating animal substances containing tallow and meat which consists in placing said substances in a closed receptacle, filling up the interstices with liquid tallow, heating the said contents, conveying away the gases, forcing steam into the receptacle to drive out the originally contained and extraneous tallow and meat extracts after the completion of the cooling, and finally removing the residuum from the receptacle and washing the same, substantially as described.

5. In apparatus for treating animal substances, a digester having suitable feed and discharge openings, steam heating pipes, a pipe for conveying away the gases, an elevated settling tank, a pipe leading from the digester to said tank, a steam pipe communicating with the digester for forcing the tallow and meat extracts from the digester to the tank, a pipe leading from the tank back to the digester for returning a portion of the separated tallow to the digester, and pipes for conveying away the separated meat extracts and tallow from the settling tank, substantially as described.

In witness whereof I have hereunto set my hand in presence of two witnesses.

MICHAEL JAMES DEMPSEY.

Witnesses:
HARRY A. SMEDLEY,
JOHN J. STONE.